US011693524B2

(12) United States Patent
Kim et al.

(10) Patent No.: US 11,693,524 B2
(45) Date of Patent: Jul. 4, 2023

(54) TOUCH SENSOR AND TOUCH SCREEN PANEL HAVING BENDING PORTION

(71) Applicant: DONGWOO FINE-CHEM CO., LTD., Jeollabuk-do (KR)

(72) Inventors: Keon Kim, Gyeonggi-do (KR); Byung Jin Choi, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/015,368

(22) Filed: Sep. 9, 2020

(65) Prior Publication Data

US 2020/0401256 A1    Dec. 24, 2020

Related U.S. Application Data

(63) Continuation of application No. 15/468,363, filed on Mar. 24, 2017, now Pat. No. 10,795,511.

(30) Foreign Application Priority Data

Mar. 31, 2016  (KR) .......................... 10-2016-0039579

(51) Int. Cl.
*G06F 3/044* (2006.01)

(52) U.S. Cl.
CPC ............ *G06F 3/0446* (2019.05); *G06F 3/044* (2013.01); *G06F 3/0443* (2019.05); *G06F 2203/04102* (2013.01); *G06F 2203/04111* (2013.01)

(58) Field of Classification Search
CPC .................................................... G06F 3/0446
(Continued)

(56) References Cited

U.S. PATENT DOCUMENTS

2012/0127112 A1* 5/2012 Lu ................. H03K 17/9622
345/174
2014/0132553 A1* 5/2014 Park ................... G06F 3/047
345/174
(Continued)

FOREIGN PATENT DOCUMENTS

KR    10-2016-0122905 A    10/2016

OTHER PUBLICATIONS

Office action dated Dec. 30, 2021 from Korean Patent Office in a counterpart Korean Patent Application No. 10-2016-0039579 (all the cited references are listed in this IDS.) (English translation is also submitted herewith.).

*Primary Examiner* — Long D Pham
(74) *Attorney, Agent, or Firm* — The PL Law Group, PLLC

(57) ABSTRACT

A touch sensor may include a substrate, a sensing pattern, and bridge electrodes. The sensing pattern may include a first pattern along a first direction and a second pattern along a second direction. The second pattern may include unit patterns isolated from each other. The bridge may electrically connect neighboring unit patterns, and the bridge electrodes adjacent in the first direction may be parallel to each other. An angle between an extending direction of the bridge electrode and the first direction may be from 45° to 89°. The substrate, the bridge electrode and the sensing pattern may be bent together to form a bending portion. The bridge electrode may extend in a direction the same as a bending direction. A bending angle between a body of the substrate which is not bent and an end portion of the bending portion may be greater than 0° and less than 180°.

12 Claims, 1 Drawing Sheet

(58) Field of Classification Search
USPC ........................................................ 345/173
See application file for complete search history.

(56) References Cited

U.S. PATENT DOCUMENTS

| | | | |
|---|---|---|---|
| 2015/0277627 A1* | 10/2015 | Pang | G06F 3/0446 345/174 |
| 2016/0062506 A1* | 3/2016 | Namkung | G06F 3/0443 345/174 |
| 2016/0170523 A1* | 6/2016 | Park | G06F 3/0443 345/174 |
| 2016/0306462 A1* | 10/2016 | Park | G06F 3/0443 |

* cited by examiner

TOUCH SENSOR AND TOUCH SCREEN PANEL HAVING BENDING PORTION

CROSS REFERENCE TO RELATED APPLICATIONS AND CLAIM OF PRIORITY

The present application is a continuation of U.S. patent application Ser. No. 15/468,363, filed on Mar. 24, 2017, which claims the benefit of Korean Patent Application No. 10-2016-0039579, filed on Mar. 31, 2016, at the Korean Intellectual Property Office, the disclosures of which are incorporated by reference herein in their entirety.

BACKGROUND

1. Technical Field

The present invention relates to a touch sensor and a touch screen panel including the same.

2. Description of the Related Art

A touch screen panel is an input device configured to transfer a user's instruction by selecting an object demonstrated on a display plane of, e.g., an image display device using a human hand or an additional input tool.

For example, the touch screen panel may be disposed at a front face of the image display device, and may convert a touched area being in contact with the human hand or the input tool into an electrical signal. An instruction selected at the touched area may be received as an input signal.

An individual input device such as a keyboard or a mouse which may be connected to the image display device may be replaced with the above-mentioned touch screen panel, and thus the touch screen panel has been widely used in various devices.

The touch screen panel may be divided to, e.g., a resistive type, a light-sensitive type and a capacitive type according to an operational mechanism thereof. In the capacitive type touch screen panel, a conductive sensing pattern may detect a change of capacitance formed together with other sensing patterns or a ground electrode when being touched by the human hand or the input tool so that the touched area may be converted into the electrical signal.

The touch screen panel is commonly attached to an outer face of a flat panel display device such as a liquid crystal display device, an organic electro-luminescence light emitting device, etc., to be integrated as a product. Thus, a high transparency and a thin thickness of the touch screen panel may be preferably required. Recently, a flexible flat panel display device has been developed, and a flexible property may be also required in the touch screen panel attached to the flexible flat panel display device.

However, a touch sensing pattern in the touch screen panel has a poor flexibility, and may be broken or fractured by a bending force. Accordingly, a desired flexible property may not be achieved.

Korean Patent Laid-Open Publication No 2011-0021532 disclosed a touch screen and a method of manufacturing a touch screen.

SUMMARY

In a touch sensor according to an aspect of the present invention, a bridge electrode is formed along the same direction as a bending direction so that damages and cracks in a bending portion may be prevented.

According to an aspect of the present invention, there is provided a touch screen panel including the touch sensor.

According to an aspect of the present invention, there is provided an image display device including the touch screen panel.

The above aspects of the present invention will be implemented or achieved as follows:

(1) A touch sensor, including: a substrate having at least one bending portion; and a sensing pattern on the substrate, the sensing pattern including a first pattern and a second pattern, the first pattern being arranged along a first direction parallel to a surface of the substrate, the second pattern being arranged along a second direction, the second direction being parallel to the surface of the substrate and crossing the first direction, wherein the second pattern includes unit patterns isolated from each other, and a bridge electrode electrically connecting neighboring unit patterns of the unit patterns, wherein the bridge electrode extends along a same direction the same as a bending direction of the bending portion.

(2) The touch sensor according to the above (1), wherein the first pattern includes unit patterns electrically connected to each other via a connecting portion.

(3) The touch sensor according to the above (1), wherein a bending angle of the bending portion is greater than 0° and less than 180°.

(4) The touch sensor according to the above (1), wherein the bridge electrode includes at least one selected from a group consisting of indium tin oxide (ITO), indium zinc oxide (IZO), indium zinc tin oxide (IZTO), aluminum zinc oxide (AZO), gallium zinc oxide (GZO), fluorine tin oxide (FTO), ITO-silver (Ag)-ITO, IZO-Ag-IZO, IZTO-Ag-IZTO and AZO-Ag-AZO.

(5) The touch sensor according to the above (1), wherein the bridge electrode includes at least one selected from a group consisting of molybdenum, silver, aluminum, copper, palladium, gold, platinum, zinc, tin, titanium and an alloy thereof.

(6) The touch sensor according to the above (2), wherein a line width of the bridge electrode is from 1.5% to 200% of the connecting portion included in the first pattern.

(7) The touch sensor according to the above (1), wherein a thickness of the bridge electrode is from 20% to 1,300% of the unit pattern included in the second pattern.

(8) The touch sensor according to the above (1), wherein an angle between the bridge electrode and the first direction is greater than 0° and not greater than 90°.

(9) The touch sensor according to the above (2), further including an insulation layer formed on the connecting portion of the first pattern.

(10) A touch screen panel including the touch sensor according to the above (1).

(11) An image display device including the touch screen panel according to the above (10).

In a touch sensor according to example embodiments, a bridge electrode may be formed along the same direction as a bending direction so that electrode damages and cracks may be prevented at a bending portion.

BRIEF DESCRIPTION OF THE DRAWINGS

The above and other objects, features and other advantages of the present invention will be more clearly understood from the following detailed description taken in conjunction with the accompanying drawings.

DETAILED DESCRIPTION

According to example embodiments, a touch sensor includes a sensing electrode that includes a first pattern 10 formed along a first direction and a second pattern 20 formed along a second direction on a substrate having at least one bending portion 1. The second pattern 20 includes a bridge electrode 30 electrically connecting isolated unit patterns, and the bridge electrode 30 is formed along the same direction as a bending direction of the bending portion 1, so that the bending portion 1 may have improved flexibility to prevent electrode damages and cracks. There is also provided a touch screen panel of high reliability which includes the touch sensor.

Hereinafter, exemplary embodiments of the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

<Touch Sensor>

A touch sensor according to example embodiments includes a sensing electrode that includes a first pattern 10 formed along a first direction and a second pattern 20 formed along a second direction on a substrate having at least one bending portion 1. The second pattern 20 includes a bridge electrode 30 electrically connecting isolated unit patterns, and the bridge electrode 30 is formed along the same direction as a bending direction of the bending portion 1.

According to example embodiments, the same direction as the bending direction may include a mathematically parallel direction, and may also include a direction with a specific angle.

The specific angle used herein means an angle with respect to the bending direction in which the bridge electrode 30 may connect the isolated unit patterns.

Substrate

The substrate may serve as a supporter for electrodes. The first pattern 10 formed along the first direction and the second pattern 20 formed along the second direction may be disposed on one surface of the substrate, and the substrate may have a flexible property.

The first and second directions may be defined as two directions being parallel to the one surface of the substrate, and crossing each other. For example, the first and second directions may be perpendicular to each other.

Figure 1:
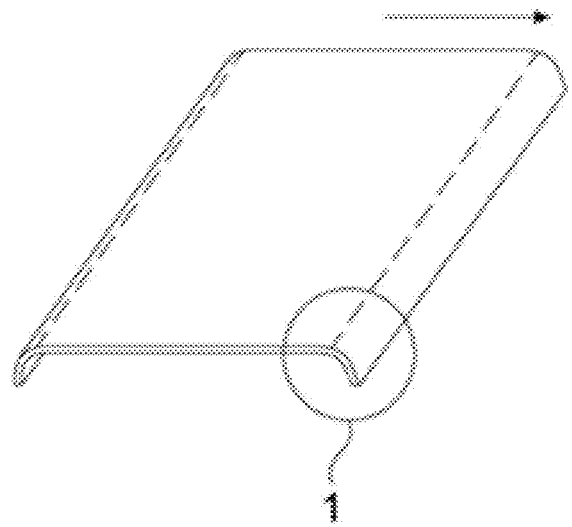
FIG. 1 is a perspective view illustrating a touch substrate in accordance with example embodiments of the present inventive concepts.

FIG. 1 is a perspective view of a touch substrate according to example embodiments.

As illustrated in FIG. 1, the substrate may include the bending portion 1. In this case, the bridge electrode 30 described below may be disposed at a predetermined area.

The substrate may include a material widely known in the related art. For example, the substrate may include glass, polyethersulphone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP), etc.

A thickness of the substrate according to example embodiments may not be specifically limited, and may be adjusted so that the substrate may be bent or folded. In this aspect, the thickness of the substrate may be in a range from about 3 μm to about 100 for example, from about 5 μm to about 80 μm.

The substrate may include the bending portion 1. The bending portion 1 may be included in consideration of functional or designing aspects of a touch screen panel. For example, an individual image may be displayed at the bending portion 1.

The bending portion 1 may be formed in at least one portion of the substrate. For example, the bending portion 1 may be formed along at least one lateral periphery of the substrate. However, an area of the bending portion 1 is not specifically limited.

Figure 2:
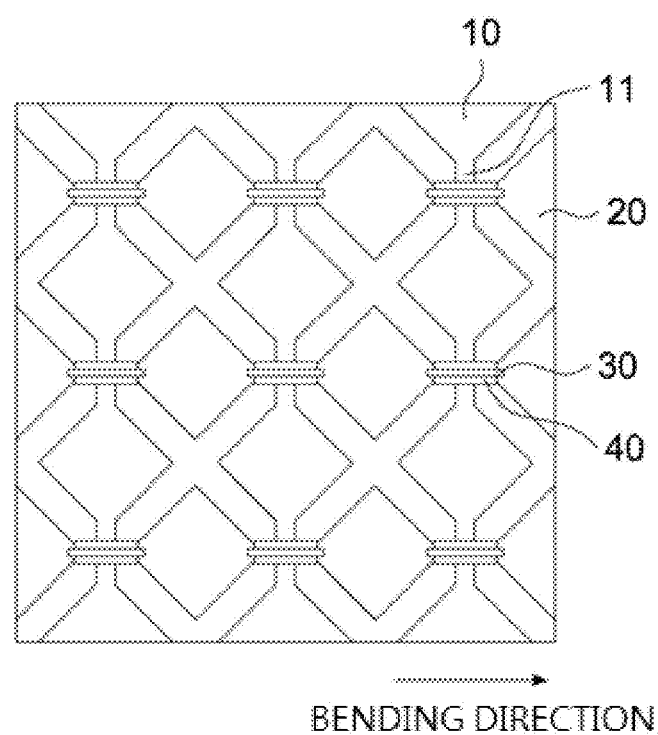
FIG. 2 is a top plane view illustrating a touch sensing pattern in accordance with example embodiments of the present inventive concepts.

The bending direction of the bending portion 1 is not specifically limited. For example, the bending direction may be substantially the same as a direction of one side of the substrate. For example, as illustrated in FIGS. 1 and 2, the bending direction of the bending portion 1 may be a horizontal direction (e.g., the second direction) from a top planar view of the substrate.

A width of the bending portion 1 is not specifically limited. For example, the width of the bending portion 1 may be in a range from about 0.1 mm to about 20 mm.

A bending angle of the bending portion 1 may be controlled so that damages and cracks may be prevented in the bridge electrode 30 facing the bending portion 1. For example, the bending angle may be greater than 0° and less than 180°, particularly in a range from about 2° to about 168°, more particularly in a range from about 4° to about 166°. In the above range, cracks may be effectively prevented in a touch electrode.

Sensing Pattern

A sensing pattern (or the sensing electrode) may be configured to provide information with regard to coordinated of the first and second directions at a touched area. Specifically, when a human hand or an individual tool touches a cover window substrate, a change of capacitance according to the touched area may be transferred to a driving circuit via sensing patterns and a position detecting line. The change of capacitance may be converted into an electrical signal to detect the touched area.

FIG. 2 is a top planar view illustrating touch sensing patterns according to some example embodiments.

The sensing pattern according to example embodiments may include the first pattern 10 formed along the first direction and the second pattern 20 formed along the second direction on the one surface of the substrate.

The first pattern 10 and the second pattern 20 may be formed on the same layer or at the same level. The first pattern 10 may have a configuration in which unit patterns may be connected to each other via a connecting portion 11. The second patterns 20 may be isolated with each other along the second direction 20 as an island shape. Accordingly, the additional bridge electrode 30 may be formed to electrically connect the second patterns 20.

The touch sensor may be formed on the substrate, and thus may be also formed on the bending portion 1. A method of forming the bending portion 1 in the touch sensor according to example embodiments is not specifically limited. For example, the touch sensor may be formed on a planar or even substrate, and then a predetermined portion of the substrate may be bent to form the bending portion 1.

Thus, it may be necessary to protect the sensing pattern from cracks while being bent. After being bent, a stress may be concentrated at the bending portion 1, and thus endurance and/or resistance to the stress may be required for the sensing pattern to be protected from the cracks.

In the touch sensor according to example embodiments, the first patterns 10 being integrally connected to each other by the connecting portion 11 may be formed vertically to the bending direction so that cracks of the sensing pattern may be prevented.

The terms used herein "vertical," and "horizontal" mean substantially "vertical" and "horizontal," and thus include mathematically strict vertical and horizontal and also include ranges generally regarded as vertical and horizontal. For example, the "vertical" may be in a range of 90±10°, and the "horizontal" may be in a range of 0±10°.

A thickness of the sensing pattern may not be specifically limited. For example, the thickness of the sensing pattern may be in a range from about 10 nm to about 200 nm. If the thickness of the sensing pattern is less than about 10 nm, electrical resistance of the sensing pattern may become excessively greater to deteriorate touch sensitivity. If the thickness of the sensing pattern exceeds about 200 nm, the sensing pattern may become visible.

The sensing pattern may include a transparent electrode material widely known in the related art. For example, the sensing pattern may include indium tin oxide (ITO), indium zinc oxide (IZO), zinc oxide (ZnO), indium zinc tin oxide (IZTO), cadmium tin oxide (CTO), a metal wire. These may be used alone or in a combination thereof. For example, the sensing pattern may include ITO.

Bridge Electrode 30

The bridge electrode 30 may electrically connect isolated unit patterns included in the second pattern 20. An insulation layer 40 may be formed so that the bridge electrode 30 may be separated from the first pattern 10 of the sensing patterns.

As illustrated in FIG. 2, the bridge electrode 30 according to example embodiments may be formed along substantially the same direction as the bending direction of the bending portion 1. Accordingly, damages and cracks of electrodes may be prevented while forming the bending portion 1, and even after forming the bending portion 1.

In this aspect, a line width of the bridge electrode 30 may be from about 1.5% to about 200% of a line width of the connecting portion 11 included in the first pattern 10. The above-mentioned effects may be well achieved in this range.

A thickness of the bridge electrode 30 is not specifically limited. For example, the thickness of the bridge electrode 30 may be from about 20% to about 1,300% relative to the unit pattern of the second pattern 20, for example, from about 30% to about 900%. If the thickness of the bridge electrode 30 is less than about 20% of the unit pattern of the second pattern 20, resistance may become greater to degrade touch sensitivity. If the thickness of the bridge electrode 30 exceeds about 1,300%, cracks may be caused in the bridge electrode 30.

An angle (or an angle difference) between the bridge electrode 30 and the first direction may be greater than 0°, and less than 90°, particularly in a range from about 30° to about 90°, more particularly in a range from about 45° to about 90°. The cracks may be reduced in the bridge electrode 30 within this range.

In some embodiments, the angle between the bridge electrode 30 and the first direction may be substantially the same as an angle between the bending direction and the first direction.

In some embodiments, the angle between the bridge electrode 30 and the first direction may be less than 90° in consideration of relieving a bending stress. For example, the angle may be in a range from about 30° to about 90°, particularly in a range from about 45° to about 90° so that the bending stress may be effectively relieved.

According to example embodiments, the bridge electrode 30 may be formed of a metal or a metal oxide. The metal having improved electrical conductivity and reduced resistance may be used. For example, the bridge electrode 30 may be formed of molybdenum, silver, aluminum, copper, palladium, gold, platinum, zinc, tin, titanium, etc., or an alloy thereof. The metal oxide may include a conductive metal oxide such as indium tin oxide (ITO), indium zinc oxide (IZO), indium zinc tin oxide (IZTO), aluminum zinc oxide (AZO), gallium zinc oxide (GZO), fluorine tin oxide (FTO), ITO-Ag-ITO, IZO-Ag-IZO, IZTO-Ag-IZTO, AZO-Ag-AZO, etc. These may be used alone or in a combination thereof. For example, a metal having enhanced malleability and ductility may be used for effectively preventing cracks.

Insulation Layer 40

The insulation layer 40 may be formed between the first pattern 10 and the bridge electrode 30 so that the first pattern 10 and the bridge electrode 30 may be insulated from each other.

The insulation layer 40 may be formed at a specific area between the first pattern 10 and the bridge electrode 30. For example, the insulation layer 40 may be formed as a pattern on the connecting portion 11 of the first pattern 10.

The insulation layer 40 may be formed of a transparent insulation material well known in the related art. For example, silicon oxide, a metal oxide, a transparent photosensitive resin composition including an acryl-based resin or a thermosetting resin composition may be used for forming the insulation layer 40.

<Touch Screen Panel and Image Display Device>

Further, an embodiment of the present invention provides a touch screen panel including the above-described touch sensor.

The touch screen panel according to example embodiments may include elements and/or structures well known to ordinarily skilled in the art in addition to the touch sensor.

The touch screen panel may be combined to an image display device well known in the related art. Non-limiting examples of the image display device include, e.g., a liquid crystal display (LCD), a field emission display (FED), a plasma display panel (PDP), an organic light emitting diode (OLED), etc.

Hereinafter, exemplary embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Example 1

An ITO layer having a thickness of 100 nm was deposited on a polyethylene terephthalate substrate having a thickness of 20 μm. The ITO layer was patterned to form a sensing pattern. The sensing patterns was formed to include first patterns in which unit patterns were connected through a connecting portion along a first direction, and second patterns isolated from each other with respect to the connecting portion along a second direction perpendicular to the first direction.

An insulation layer was formed on the connecting portion (line width: 125 μm) of the first pattern, and an ITO bridge electrode (line width: 30 μm, thickness: 1,350 nm) was formed on the insulation layer along the second direction such that the isolated second patterns were electrically connected to each other to obtain a touch sensor.

Subsequently, a bending portion (bent angle: 85°) was formed at one lateral portion of the touch sensor along a bending direction the same as the second direction.

Example 2

The process the same as that described in Example 1 was performed except that the bridge electrode was formed of an alloy of Ag, Pd and Cu to obtain a touch sensor.

Example 3

The process the same as that described in Example 1 was performed except that an angle between the bridge electrode and the first direction was adjusted as described in Table 1 below to obtain a touch sensor.

Example 4

The process the same as that described in Example 1 was performed except that an angle between the bridge electrode and the first direction was adjusted as described in Table 1 below to obtain a touch sensor.

Example 5

The process the same as that described in Example 1 was performed except that an angle between the bridge electrode and the first direction was adjusted as described in Table 1 below to obtain a touch sensor.

Example 6

The process the same as that described in Example 1 was performed except that an angle between the bridge electrode and the first direction was adjusted as described in Table 1 below to obtain a touch sensor.

Example 7

The process the same as that described in Example 1 was performed except that an angle between the bridge electrode and the first direction was adjusted as described in Table 1 below to obtain a touch sensor.

Example 8

The process the same as that described in Example 1 was performed except that an angle between the bridge electrode and the first direction was adjusted as described in Table 1 below to obtain a touch sensor.

Example 9

The process the same as that described in Example 1 was performed except that an angle between the bridge electrode and the first direction was adjusted as described in Table 1 below to obtain a touch sensor.

Comparative Example

The process the same as that described in Example 1 was performed except that the bending portion was formed using the first direction as the bending direction to obtain a touch sensor.

Experimental Example (1) Evaluating Cracks

The touch sensors of Examples and Comparative Example were maintained for 24 hours in a condition including a radius of 2.5 mm and a bending angle of 90°, and then the number of channels including cracks among entire 27 channels was measured. The results are shown in Table below.

(2) Evaluating Relaxation of Bending Stress

The touch sensors of Examples and Comparative Example were set in a condition including a radius of 2.5 mm and a bending angle of 90°, and then a degree of bending stress relaxation was evaluated as follows. The results are shown in Table 1 below.

◎ (Excellent): The degree of bending stress relaxation was equal to or greater than 90%

○ (Good): The degree of bending stress relaxation was in a range from 70% to 90%

Δ (Normal): The degree of bending stress relaxation was in a range from 40% to 70%

X (BAD): The degree of bending stress relaxation was less than 40%

TABLE 1

| | Angle between the bridge electrode and the first direction | Evaluation of Cracks | degree of bending stress relaxation in Bridge Electrode |
|---|---|---|---|
| Example 1 | 90° | 0 | ○ |
| Example 2 | 89° | 0 | ◎ |
| Example 3 | 85° | 0 | ◎ |
| Example 4 | 75° | 0 | ◎ |
| Example 5 | 54° | 1 | ○ |
| Example 6 | 45° | 2 | ○ |
| Example 7 | 40° | 2 | X |
| Example 8 | 31° | 5 | X |
| Example 9 | 13° | 10 | X |
| Comparative Example | 0° | 27 | X |

Referring to Table 1, electrode damages and cracks in the sensing pattern were significantly reduced in the touch sensors of Examples. Thus, the touch sensors of Examples had a high reliability when compared to those of Comparative Example.

What is claimed is:

1. A touch sensor, comprising:
a substrate;
a sensing pattern on the substrate, the sensing pattern comprising a first pattern and a second pattern, the first pattern being arranged along a first direction parallel to a surface of the substrate, the second pattern being arranged along a second direction, the second direction being parallel to the surface of the substrate and crossing the first direction, the second pattern comprising unit patterns isolated from each other; and a plurality of bridge electrodes electrically connecting neighboring unit patterns of the unit patterns, wherein all of the plurality of bridge electrodes have the same extending direction, wherein an angle between an extending direction of the bridge electrode and the first direction in a planar view is from 45° to 89°;

the substrate, the bridge electrode and the sensing pattern are bent together to form a bending portion, and the bridge electrode extends in a direction the same as a bending direction of the bending portion; and the bending direction is a direction toward the bending portion of the substrate, a bending angle between a body of the substrate which is not bent and an end portion of the bending portion is greater than 0° and less than 180°.

2. The touch sensor of claim 1, wherein the first pattern comprises a connecting portion and unit patterns electrically connected to each other via the connecting portion.

3. The touch sensor of claim 2, further comprising an insulation layer formed on the connecting portion of the first pattern.

4. The touch sensor of claim 3, wherein the bridge electrode is disposed at a different level from that of the first pattern and electrically separated from the first pattern by the insulation layer.

5. The touch sensor of claim 2, wherein a line width of the bridge electrode is from 1.5% to 200% of the connecting portion included in the first pattern.

6. The touch sensor of claim 1, wherein the bending direction is a direction toward the bending portion of the substrate.

7. The touch sensor of claim 1, wherein the first pattern and the second pattern are disposed at the same level.

8. The touch sensor of claim 1, wherein the bridge electrodes comprise at least one selected from a group consisting of indium tin oxide (ITO), indium zinc oxide (IZO), indium zinc tin oxide (IZTO), aluminum zinc oxide (AZO), gallium zinc oxide (GZO), fluorine tin oxide (FTO), ITO-silver (Ag)-ITO, IZO-Ag-IZO, IZTO-Ag-IZTO and AZO-Ag-AZO.

9. The touch sensor of claim 1, wherein the bridge electrodes comprise at least one selected from a group consisting of molybdenum, silver, aluminum, copper, palladium, gold, platinum, zinc, tin, titanium and an alloy thereof.

10. The touch sensor of claim 1, wherein a thickness of the bridge electrode is from 20% to 1,300% of a thickness of the unit pattern included in the second pattern.

11. A touch screen panel comprising the touch sensor of claim 1.

12. An image display device comprising the touch screen panel of claim 11.

* * * * *